(12) United States Patent
Bazley

(10) Patent No.: US 10,342,382 B2
(45) Date of Patent: Jul. 9, 2019

(54) TRIVET SYSTEM

(71) Applicant: Bruce Ian Bazley, Kelowna (CA)

(72) Inventor: Bruce Ian Bazley, Kelowna (CA)

(*) Notice: Subject to any disclaimer, the term of this patent is extended or adjusted under 35 U.S.C. 154(b) by 0 days.

(21) Appl. No.: 14/362,451

(22) PCT Filed: Dec. 7, 2012

(86) PCT No.: PCT/CA2012/050883
§ 371 (c)(1),
(2) Date: Jun. 3, 2014

(87) PCT Pub. No.: WO2013/082723
PCT Pub. Date: Jun. 13, 2013

(65) Prior Publication Data
US 2014/0332651 A1    Nov. 13, 2014

Related U.S. Application Data

(60) Provisional application No. 61/568,044, filed on Dec. 7, 2011, provisional application No. 61/567,972, filed on Dec. 7, 2011.

(51) Int. Cl.
| | | |
|---|---|---|
| A47B 91/00 | (2006.01) |
| A47J 36/34 | (2006.01) |
| A47J 45/10 | (2006.01) |
| A47J 47/16 | (2006.01) |

(52) U.S. Cl.
CPC ............ *A47J 36/34* (2013.01); *A47J 45/10* (2013.01); *A47J 47/16* (2013.01)

(58) Field of Classification Search
CPC .................................. A47J 36/34; A47G 23/03
See application file for complete search history.

(56) References Cited

U.S. PATENT DOCUMENTS

| | | | |
|---|---|---|---|
| 4,550,894 A | 11/1985 | Barlies | |
| 7,048,243 B1 | 5/2006 | Steinman | |
| 7,984,885 B2 | 7/2011 | Lion et al. | |
| D708,895 S * | 7/2014 | Hoyord et al. | D7/388 |
| D711,683 S * | 8/2014 | Japy | D7/388 |
| 2007/0034755 A1* | 2/2007 | Duke | 248/127 |

OTHER PUBLICATIONS

WIPO, Canadian International Searching Authority, International Search Report dated Feb. 14, 2013 in International Patent Application No. PCT/CA2012/050883, 2 pages.
WIPO, Canadian International Searching Authority, Written Opinion of the International Searching Authority dated Feb. 14, 2013 in International Patent Application No. PCT/CA2012/050883, 5 pages.

* cited by examiner

*Primary Examiner* — Amy J. Sterling
(74) *Attorney, Agent, or Firm* — Cameron IP

(57) ABSTRACT

A trivet system comprises a first trivet and a second trivet coupled to the first trivet. The first trivet and the second trivet are moveable relative to one another between a position in which the second trivet is disposed within a perimeter of the first trivet, and a position in which the second trivet is disposed outside a perimeter of the first trivet. There may also be a third trivet coupled to the second trivet. The second trivet and the third trivet are movable relative to one another between a position in which the third trivet is disposed within a perimeter of the second trivet, and a position in which the third trivet is disposed outside a perimeter of the second trivet.

3 Claims, 20 Drawing Sheets

TRIVET SYSTEM

CROSS-REFERENCE TO RELATED APPLICATIONS

This application claims the benefit of provisional application No. 61/567,972 filed in the United States Patent and Trademark Office on Dec. 7, 2011 and provisional application No. 61/568,044 filed in the United States Patent and Trademark Office on Dec. 7, 2011, the disclosures of which are incorporated herein by reference and priority to which are claimed.

BACKGROUND OF THE INVENTION

Field of the Invention

The present invention relates to trivets and, in particular, to a trivet system comprising a plurality of coupled trivets moveable between a nested configuration and a deployed configuration.

Description of the Related Art

U.S. Pat. No. 7,048,243 which issued to Steinman on May 23, 2006 discloses a trivet comprising a pad of thermal insulating material having opposite surfaces from each of which a plurality of uniform height projections extends so as to provide a space between a container supported at one side of the body and a space between the body and the surface of an article on which the body is supported. The body has at least one opening therein for the removable accommodation of a retainer having a stem and an enlargement at one end thereof which may be deformed to enable it to pass through the opening in the body. The opposite end of the stem is joined to a coupling strap terminating at its opposite end in a second, similar retainer thereby enabling the coupling strap to join two similar bodies to one another.

SUMMARY OF THE INVENTION

It is an object of the present invention to provide an improved trivet system and, in particular, to provide a trivet system which includes a plurality of coupled trivets which are moveable between a nested configuration and a deployed configuration.

There is accordingly provided a trivet system comprising a first trivet and a second trivet coupled to the first trivet. The second trivet is movable between a nested position in which the second trivet is disposed within a perimeter of the first trivet and a deployed position in which the second trivet is disposed outside a perimeter of the first trivet. There may also be a third trivet coupled to the second trivet. The third trivet is movable between a nested position in which the third trivet is disposed within a perimeter of the second trivet and a deployed position in which the third trivet is disposed outside a perimeter of the second trivet.

At least one of the first trivet, the second trivet, and the third trivet may be provided with a radially extending tab which may function as a handle of the trivet system. There may be an opening extending through the radially extending tab to allow the trivet system to be hung. A first hinge may couple the first trivet to the second trivet and a second hinge may couple the second trivet to the third trivet. The first hinge and the second hinge may be aligned or angularly offset relative to one another. The first hinge may space the first trivet apart from the second trivet. The second hinge may space the second trivet apart from the third trivet. At least one of the first trivet, the second trivet and the third trivet may be provided with a recess which may function as utensil rest. There may be a releasable locking or retaining mechanism for maintaining the trivet system in the nested configuration. There may be spacings between the trivets when the trivet system is in the nested configuration.

There is also provided a trivet system without hinges wherein a first elongate connector couples the first trivet and the second trivet and a second elongate connector which couples the second trivet and the third trivet. The first trivet is rotatable at its point of connection with the first elongate member about an axis which is orthogonal to a plane containing the first trivet. The second trivet is rotatable about its point of connection with the first elongate connector about an axis which is orthogonal to a plane containing the second trivet, and the second trivet is rotatable about its point of connection with the second elongate connector about an axis which is orthogonal to the plane containing the second trivet. The third trivet is rotatable at is point of connection with the first elongate connector about an axis which is orthogonal to a plane containing the third trivet. The first trivet may be pivotable relative to the second trivet. The second trivet may be pivotable relative to the first trivet and the second trivet may pivotable relative to the third trivet. The third trivet is pivotable relative to the second trivet. The trivet system may further including channels for receiving the first elongate connector and the second elongate connector.

In the nested configuration, the trivet system may include three co-planar, annular or otherwise shaped trivets concentrically nested around a geometric center. The trivets include, but are not limited to, an innermost trivet nested within a middle trivet nested within an outermost trivet. The trivets may be hinged to one another by at least first and second hinges. Relative to the geometric center the first and second hinge mechanisms or hinges have an angular relation relative to one another which dictates a laid-out geometry of the trivets when in their fully deployed position. Alternatively, the trivets may be swing-connected to one another by at least first and second swing members. The geometry of the trivets relative to one another may be adjusted about the pivots of the swing-connections when in their fully deployed position.

In a partially deployed position, the trivets are co-planar and at least the middle trivet may be rotated 180 degrees outwardly of the outermost trivet about the first hinge so as to lie outside of a perimeter of the outermost trivet, and wherein in one embodiment the innermost trivet is concentrically retained within the middle trivet during deployment, and in a further embodiment the innermost trivet pivots independently outwardly of the now outer trivet, that is, independently of the middle trivet. Alternatively, the trivets are co-planar and at least the middle trivet is swung outwardly of the outer trivet about a vertical first axis of rotation of the first linear swing member, i.e., about an axis orthogonal to the plane containing the trivets, so as to lie outside of the perimeter of the outer trivet, and wherein one embodiment the inner trivet is concentrically retained within the middle trivet during deployment, and in a further embodiment the inner trivet swings independently outwardly of the outer trivet, that is, independently of the middle trivet.

In the fully deployed position, the trivets are co-planar and the middle trivet is pivoted relative to the outermost trivet about the first hinge so as to lie outside of the perimeter of the outermost trivet, and the innermost trivet is pivoted outwardly of the middle or outermost trivet about the second hinge so as to be outside of a perimeter of the middle or outer trivet respectively. In the fully deployed position the trivets are arranged within a co-planar geometric spatial position relative to one another dictated by the first angular relation of the first and second hinges. Alternatively, the middle trivet is swung outwardly of the outer trivet about a further vertical axis of rotation so as to lie outside of the perimeter of the outer trivet, and the inner trivet is swung outwardly of the middle or outer trivet so as to be outside of a perimeter of the middle or outer trivet respectively. In the fully deployed position the trivets are arranged within a co-planar geometric spatial position relative to one another dictated by the amount the trivets are swung outwardly relative to one another.

Characteristics of the improved trivet system disclosed herein include but are not limited to:
(a) With respect to orientation:
   a. The trivets can unfold or deploy in a straight line; or
   b. The trivets can unfold or deploy in an angled, right angled or variable angles.
(b) Ring Count:
   a. The trivet system may comprise two or three or four or more trivets.
(c) Center Hole:
   a. The central or core trivet can be solid or open.
(d) Spoon Rest:
   a. A solid center core trivet may have recesses depressions for use as a utensil rest.
(e) Connection:
   a. The various trivets can be connected by various forms of swing members such as bands, rods, cables, etc.
(f) Retainers:
   a. The trivets can be held together in their closed position with magnets, compression 'bumps' or similar closing devices.
(g) Materials:
   a. The trivets can be fabricated from rigid or flexible materials having a variety of colours and textures provided the materials are heat resistant to typical hot temperatures (for example 230° C.+).
(h) Hanger:
   a. One or more of the trivets can be supplied with a hanger, for example on the outside trivet, for example, extending from the post as an extension of the swing member, which allows the trivet to hang from a wall.

In alternative embodiments further trivets are nested one within another so that, for example, the inner trivet may have a fourth or core trivet nested therein which may for example be hinged to the inner trivet for outward folding therefrom.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
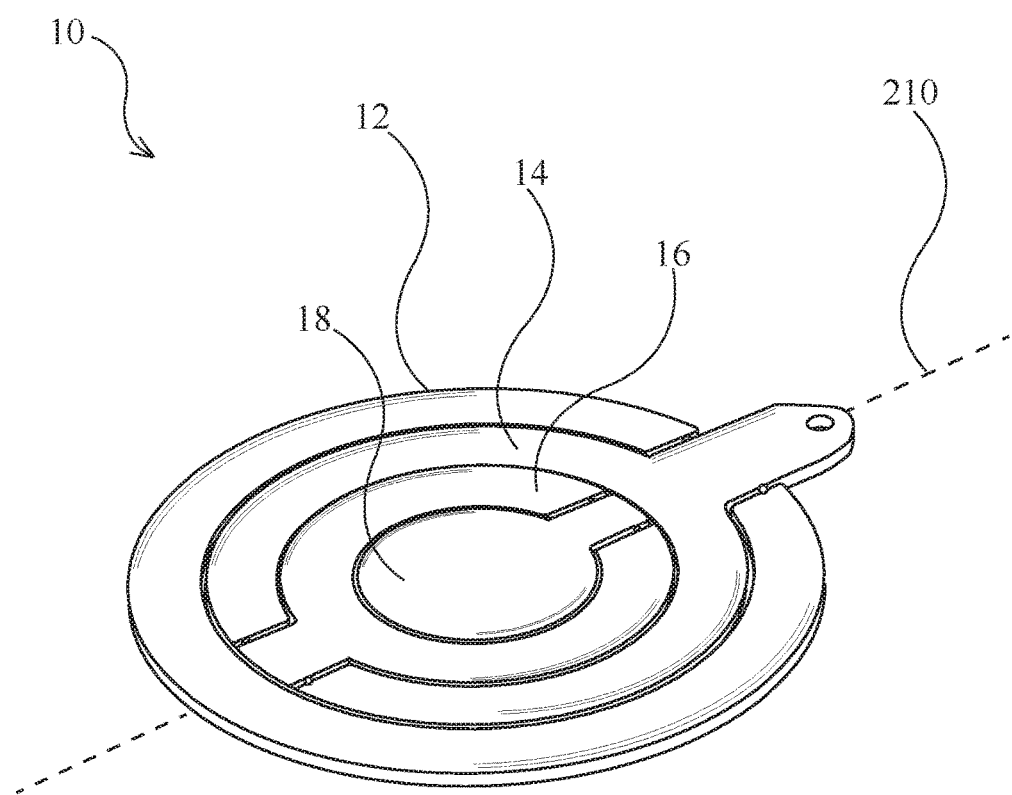
FIG. 1 is a top, side view of a first embodiment of an improved trivet system in a nested configuration.

Referring to the drawings and first to FIGS. 1 to 4, a first embodiment of an improved trivet system 10 is shown. The trivet system 10 is shown in a nested configuration in FIG. 1 and includes three substantially annular trivets 12, 14 and 16. In the nested configuration a first trivet 12 is an outermost annular trivet, a second trivet 14 is a middle annular trivet, and a third trivet 16 is an innermost annular trivet. There is also a fourth trivet 18 which is circular and whose center is a geometric center of the trivet system 10 when the trivet system is in the nested configuration. The trivets are coupled to one another to allow each trivet to move through at least a 180 degree range of motion relative to an adjacent trivet. This allows the trivet system 10 to move between the nested configuration shown in FIG. 1 and deployed configurations shown in FIGS. 2 to 4. In other embodiments the trivets may be any shape and dimension provided the trivets are coupled and may be moved between a nested configuration and a deployed configuration.

Figure 2:
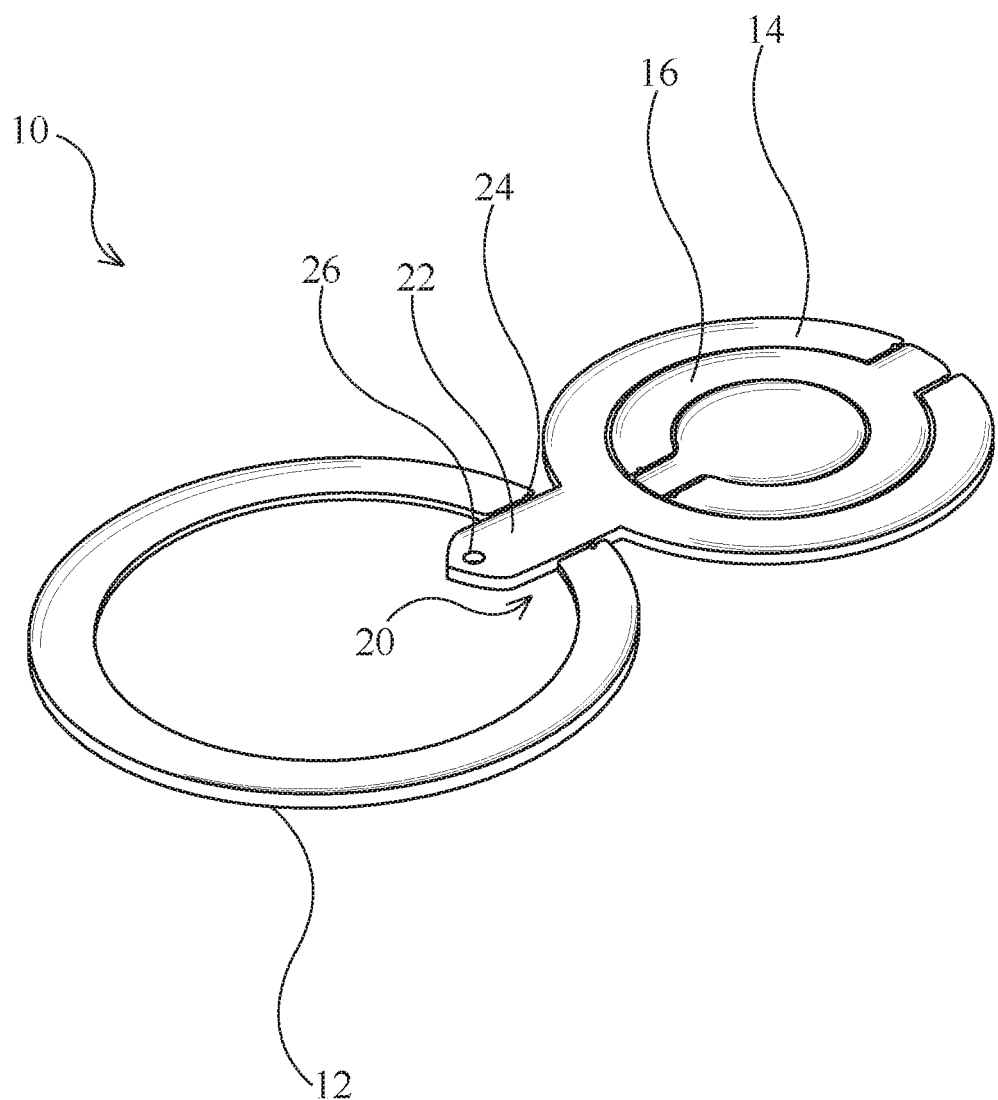
FIG. 2 is a top, side view of the trivet system of FIG. 1 in a partially deployed configuration.

In this embodiment of the trivet system 10, and with reference to FIG. 2, the first trivet 12 is provided with a gap 20 which receives a radially extending tab 22 of the second trivet 14. A pivot pin 24 extends across the gap 20 and through the tab 22 to couple the first trivet 12 and the second trivet 14. The pivot pin 24 functions as a hinge and allows the first trivet 12 and the second trivet 14 to move through at least a 180 degree range of motion relative to one another. The first trivet 12 and the second trivet 14 are thereby moveable relative to one another between the positions shown in FIGS. 1 and 2. In FIG. 1 the second trivets 14 is disposed within a perimeter of the first trivet 12. In FIG. 2 the second trivet 14 is disposed outside the perimeter of the first trivet 12.

The tab 22 of the second trivet 14 extends radially outward of the first or outermost annular trivet 12 when the trivet system 10 is in the nested configuration, as shown in FIG. 1, and the tab 22 may function as a handle. The tab 22 is also provided with an opening 26 extending therethrough which may allow the trivet system 10 to be hung on a wall by means of a hook extending through the opening 26. However, in other embodiments of the trivet system, the tab of the second trivet may not extend radially outward of the first trivet. Rather another one of the trivets, for example, the first trivet may be provided with a radially extending tab provided with an opening extending therethrough which may both function as a handle and allow the trivet system to be hung. The trivet system may be hung in either the nested configuration or the deployed configuration. Other embodiments of the trivet system may further be provided with other means, for example suction cups or magnets, to allow the trivet system to be suspended from a smooth or magnetized surface such as a refrigerator.

Figure 3:
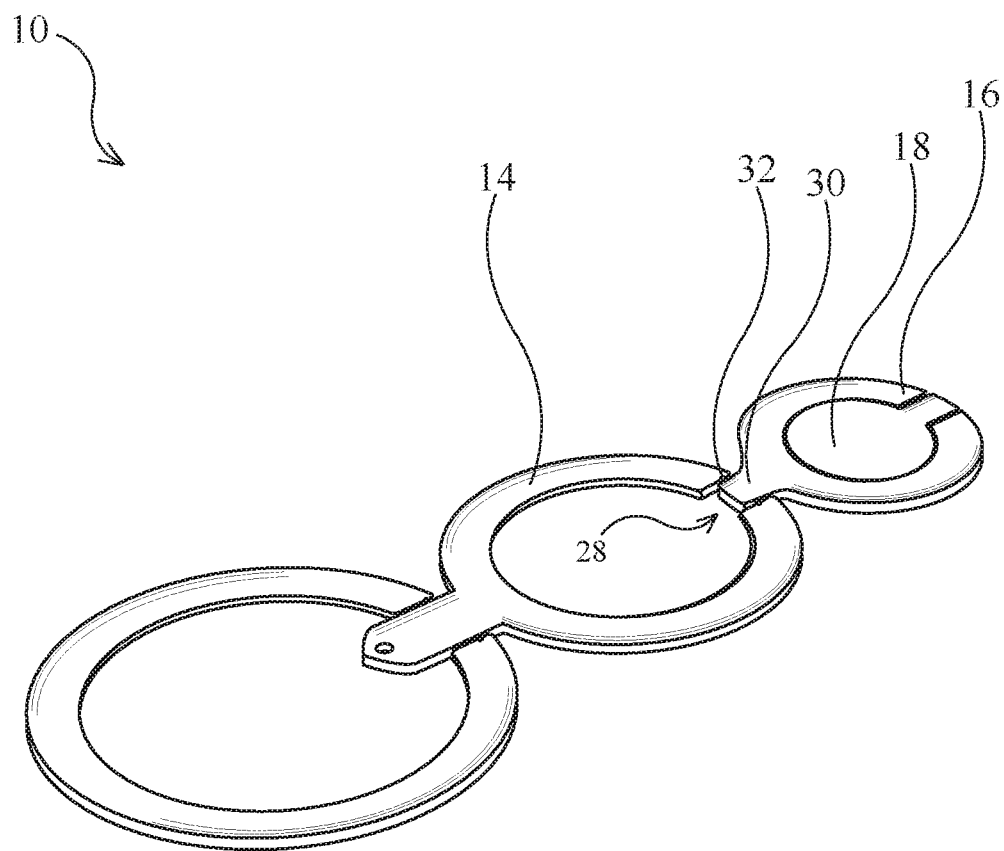
FIG. 3 is a top, side view of the trivet system of FIG. 1 in another partially deployed configuration.

Referring now to FIG. 3, the second trivet 14 is provided with a gap 28 which receives a radially extending tab 30 of the third trivet 16. A pivot pin 32 extends across the gap 28 and through the tab 30 to couple the second trivet 14 and the third trivet 16. The pivot pin 32 functions as a hinge and allows the second trivet 14 and third trivet 16 to move through at least a 180 degree range of motion relative to one another. The second trivet 14 and the third trivet 16 are thereby moveable relative to one another between the positions shown in FIGS. 2 and 3. In FIG. 2 the third trivet 16 is disposed within a perimeter of the second trivet 14. In FIG. 3 the third trivet 16 is disposed outside the perimeter of the second trivet 14.

Figure 4:
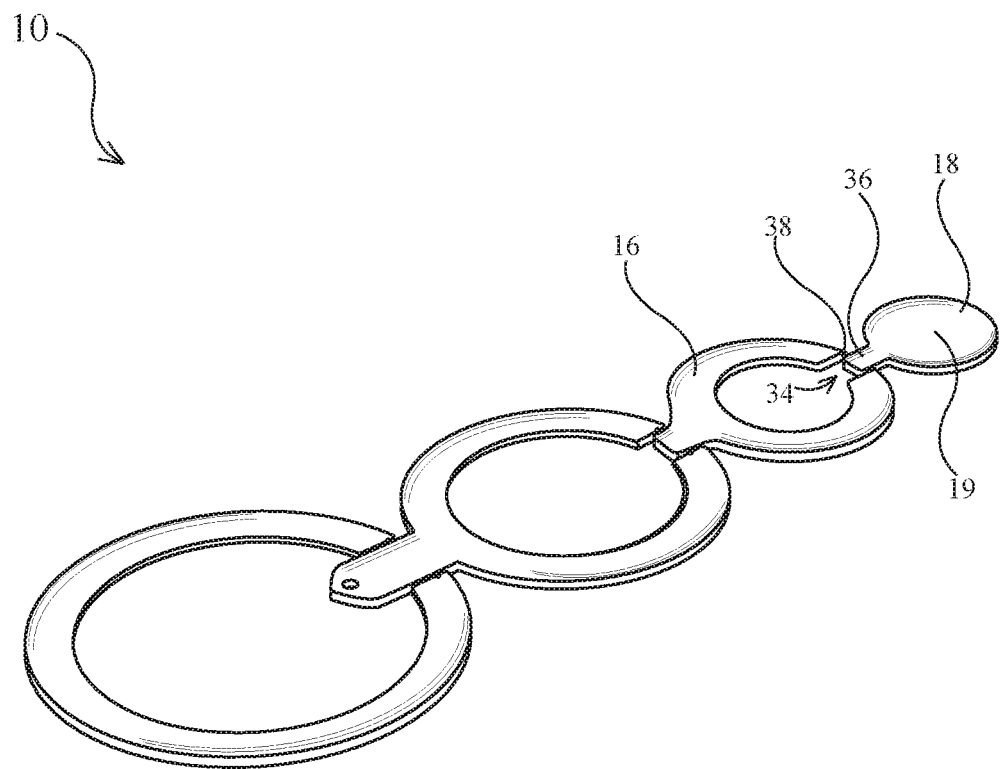
FIG. 4 is a top, side view of the trivet system of FIG. 1 in a fully deployed configuration.
Figure 5:
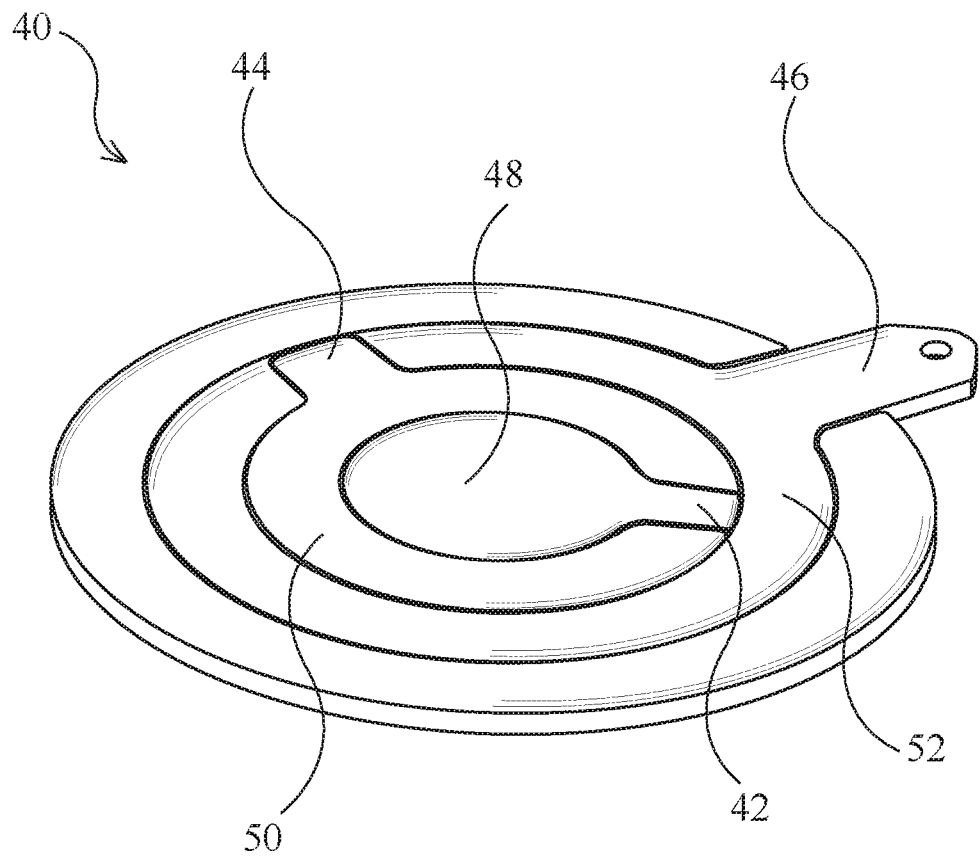
FIG. 5 is a top, side view of a second embodiment of an improved trivet system in a nested configuration.
Figure 6:
FIG. 6 is a top, side view of the trivet system of FIG. 5 in a partially deployed configuration.
Figure 7:
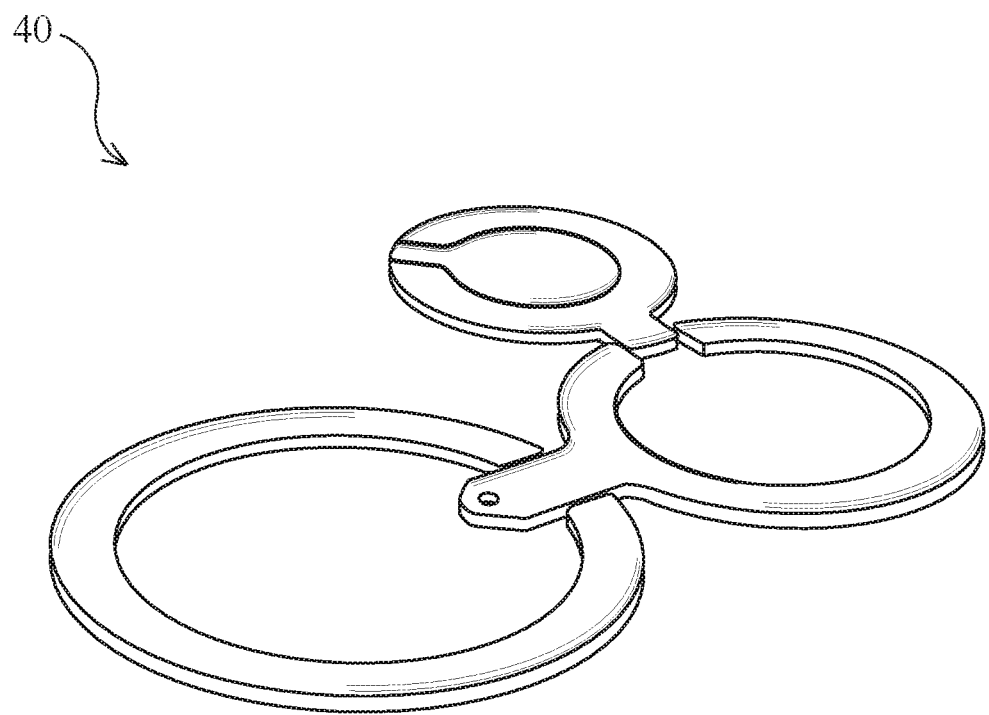
FIG. 7 is a top, side view of the trivet system of FIG. 5 in another partially deployed configuration.
Figure 8:
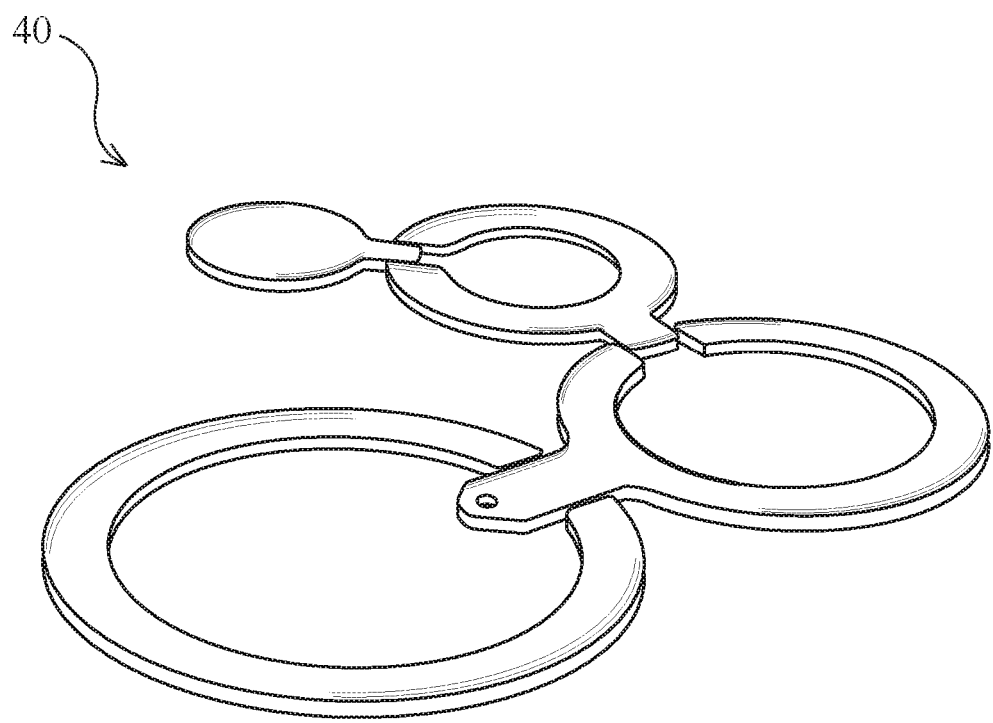
FIG. 8 is a top, side view of the trivet system of FIG. 5 in a fully deployed configuration.

Likewise, and as best shown in FIG. 4, the third trivet 16 is provided with a gap 34 which receives a radially extending tab 36 of the fourth trivet 18. A pivot pin 38 extends across the gap 34 and through the tab 36 to couple the third trivet 16 and the fourth trivet 18. The pivot pin 38 functions as a hinge and allows the second trivet 16 and the third trivet 18 to move through at least a 180 degree range of motion relative to one another. The third trivet 16 and the fourth trivet 18 are thereby moveable relative to one another between the positions shown in FIGS. 3 and 4. In FIG. 3 the fourth trivet 18 is disposed within a perimeter of the third trivet 16. In FIG. 4 the fourth trivet 18 is disposed outside the perimeter of the third trivet 16. The fourth trivet 18 has concave recess 19, shown in FIG. 4, on at least one side thereof and possibly on both sides thereof The concave recess 19 may function as a utensil rest. Further recesses may be provided elsewhere on the trivet system 10 which may also function as utensil rests.

In the first embodiment of the trivet system 10 the radially extending tabs 22, 30 and 36 of corresponding trivets 14, 16 and 18 are substantially aligned along a common axis 210 as best shown in FIG. 1. The trivet system 10 accordingly deploys from the nested configuration in a substantially linear trajectory as shown in FIGS. 1 to 4. However, in other embodiments, the radially extending tabs of the trivets may be angularly offset relative to one another. The relative angles between the radially extending tabs of the trivets dictates the deployment trajectory of the trivet system from the nested configuration through the deployed configurations. It is therefore possible, by altering the relative angles between radially extending tabs, to provide a variety of deployment trajectories. This may be done for functional purposes, for example, to provide a person easy reach to all hot pots resting on the trivets.

A second embodiment of an improved trivet system 40 is shown in FIGS. 5 to 8. The second embodiment of the trivet system 40 is substantially identical to the first embodiment of the trivet system 10 shown in FIGS. 1 to 4 with the following notable exception. The respective 42, 44 and 46 tabs of the trivets 48, 50 and 52 are angularly offset relative to one another. The second embodiment of the trivet system 40 accordingly deploys in a nonlinear trajectory as shown in FIGS. 5 to 8.

Figure 9:
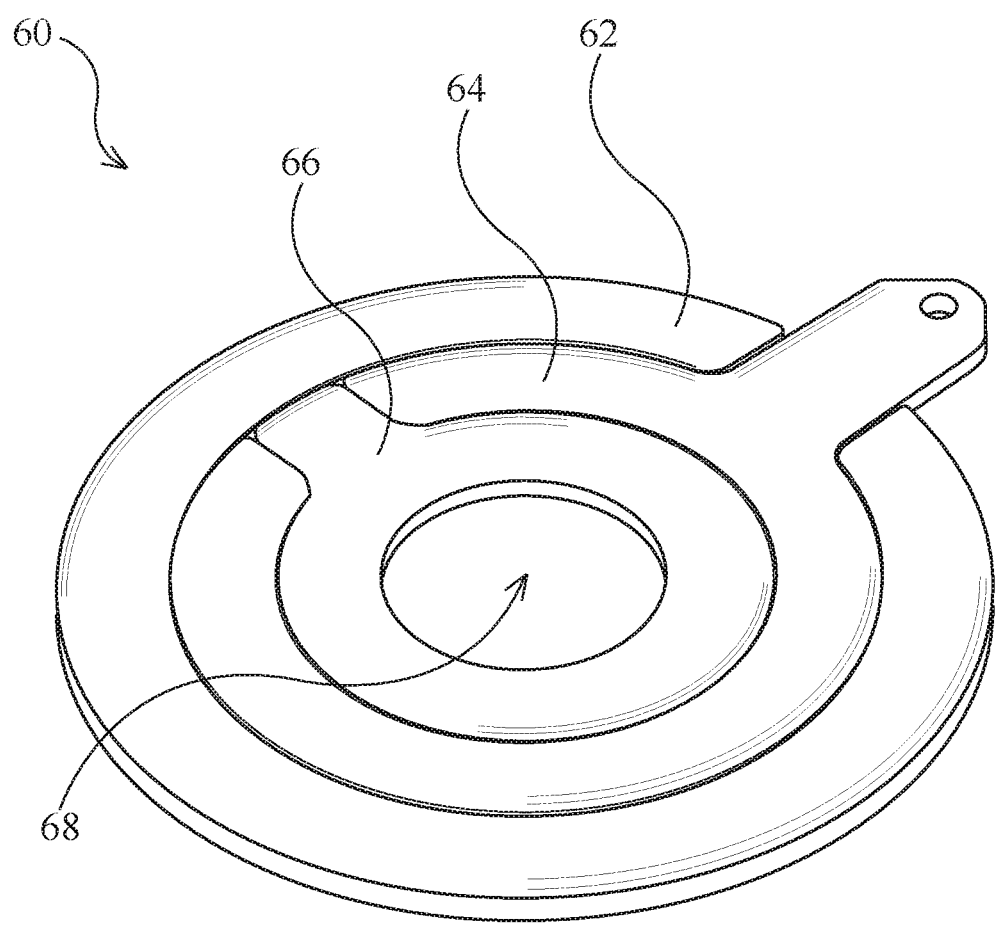
FIG. 9 is a top, side view of a third embodiment of an improved trivet system in a nested configuration.

A third embodiment of an improved trivet system 60 is shown in a nested configuration in FIG. 9. The third embodiment of the trivet system 60 is substantially identical to the second embodiment of the trivet system 40 shown in FIGS. 5 to 8 with the following notable exception. The third embodiment of the trivet system 60 includes a first trivet 62, a second trivet 64, and a third trivet 66 but does not include a fourth trivet. Rather the third embodiment of the trivet system 60 has a central opening 68 in the nested configuration.

Figure 10:
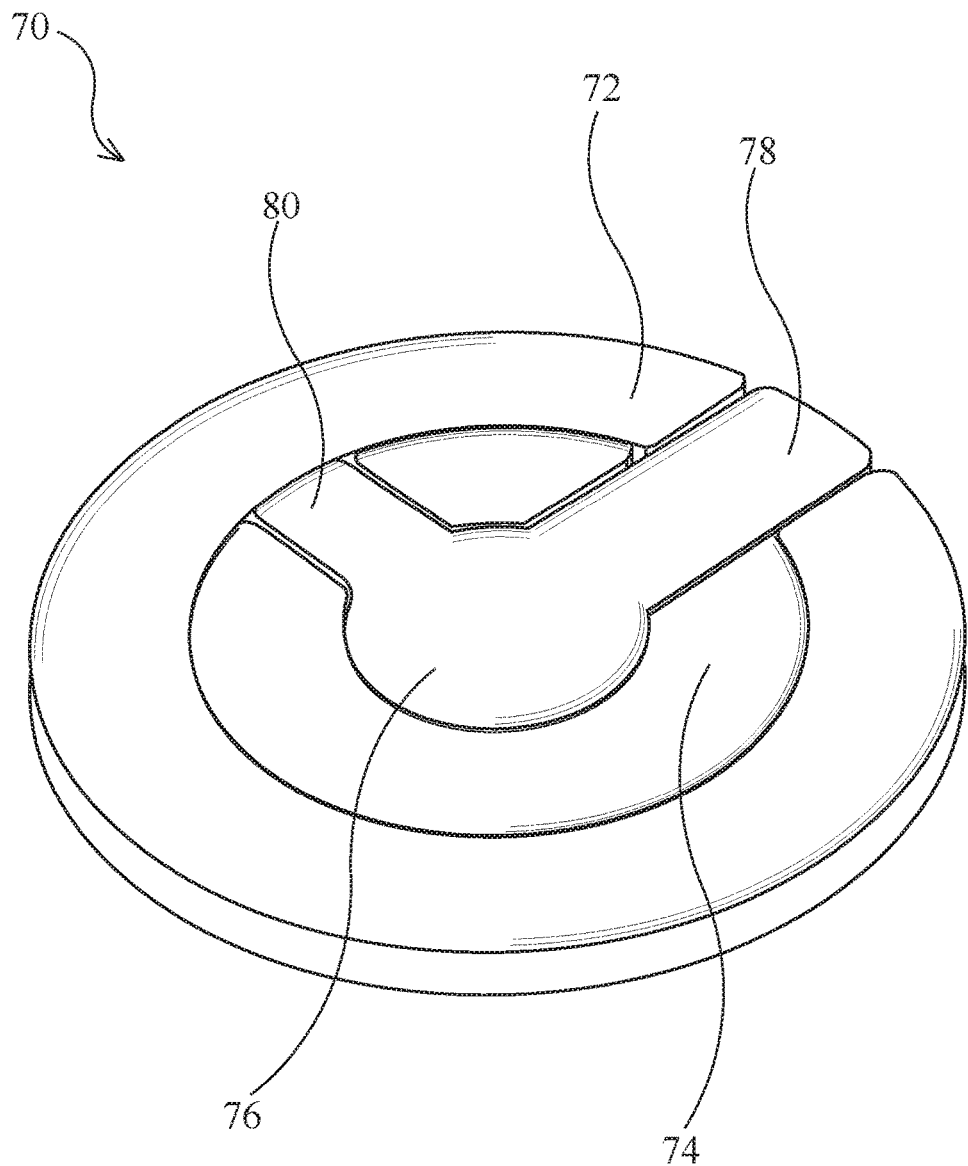
FIG. 10 is a top, side view of a fourth embodiment of an improved trivet system in a nested configuration.
Figure 11:
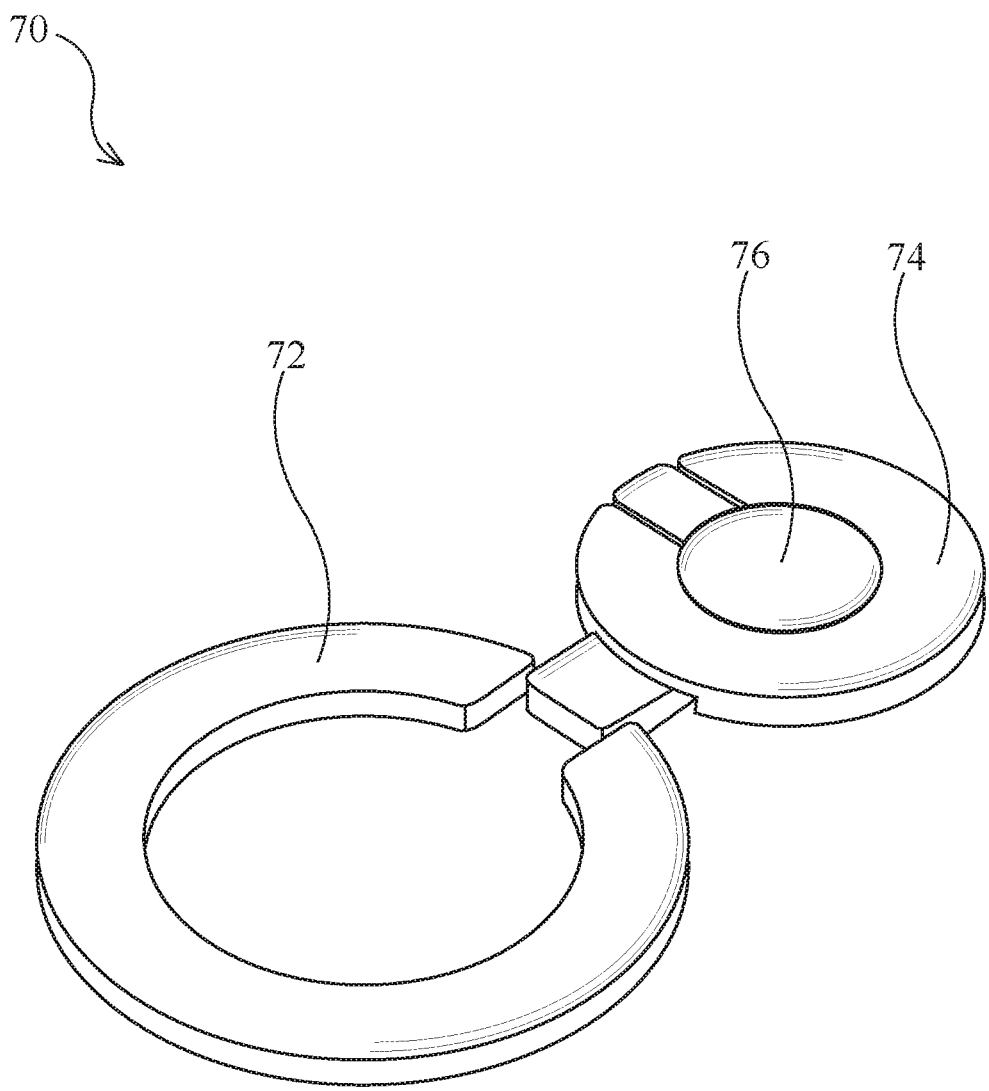
FIG. 11 is a top, side view of the trivet system of FIG. 10 in a partially deployed configuration.
Figure 12:
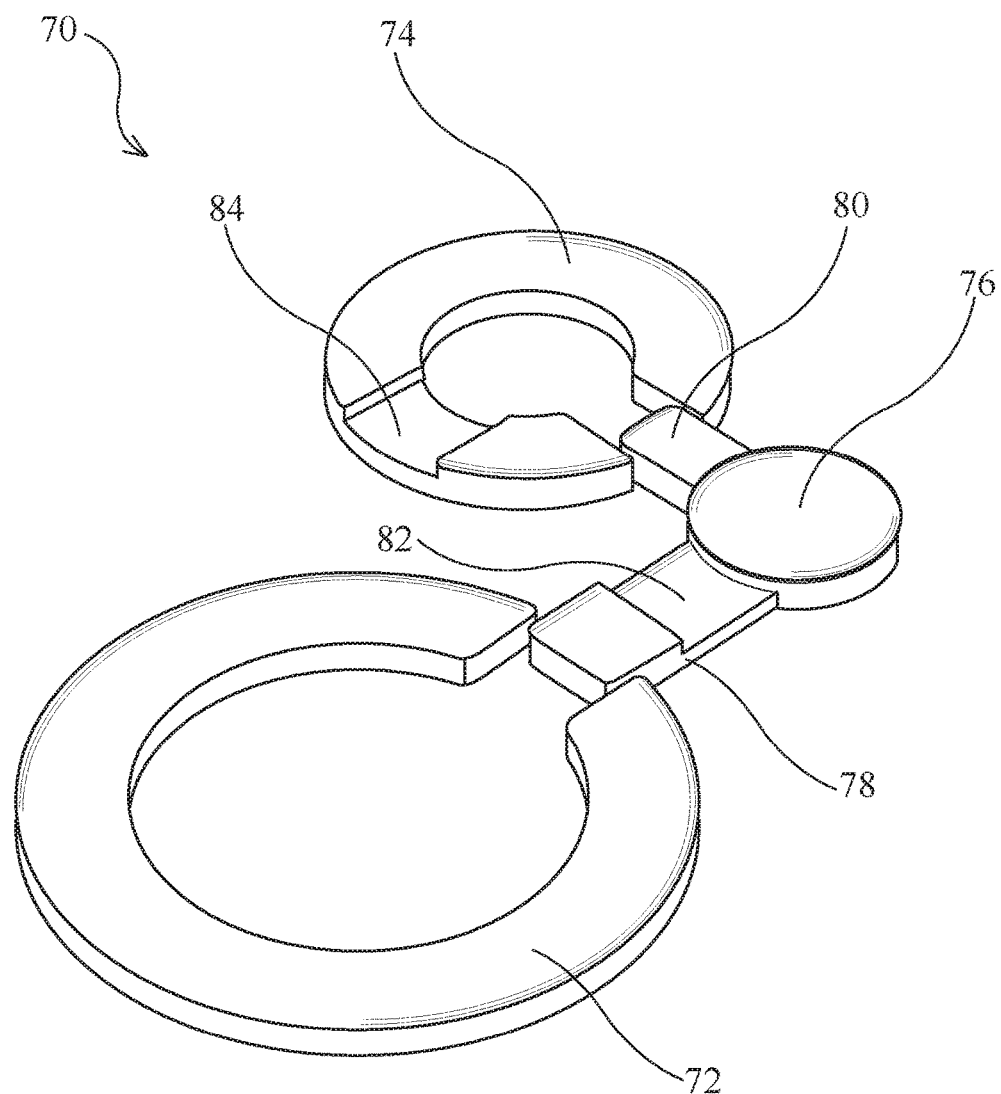
FIG. 12 is a top, side view of the trivet system of FIG. 10 in a fully deployed configuration.

A fourth embodiment of an improved trivet system 70 is shown in FIGS. 10 to 12. The fourth embodiment of the trivet system 70 includes a first trivet 72, a second trivet 74, and a third trivet 76. In the fourth embodiment of the trivet system 70 only the third trivet 76 is provided with the radially extending tabs 78 and 80 which are offset at right angles to one another and respectively couple the third trivet 76 to the first trivet 72 and the second trivet 74. The third trivet 76 is coupled to the first trivet 72 and the second trivet 74 with a pivot pin in a manner similar to as described above for the first embodiment of the trivet system 10 which is shown FIGS. 1 to 4. As best shown in FIG. 12, the radially extending tab 78 of the third trivet 76 is provided with a channel 82. There is also a channel 84 in the second trivet 74. The channel 84 in the second trivet 74 is positioned such that it engages the channel 82 in the radially extending tab 78 of the third trivet 76 when the fourth embodiment of the trivet system 70 is in the nested configuration as shown in FIG. 10. The third trivet 70 may be provided with a recess on at least one side thereof to function as a utensil rest.

Figure 13:
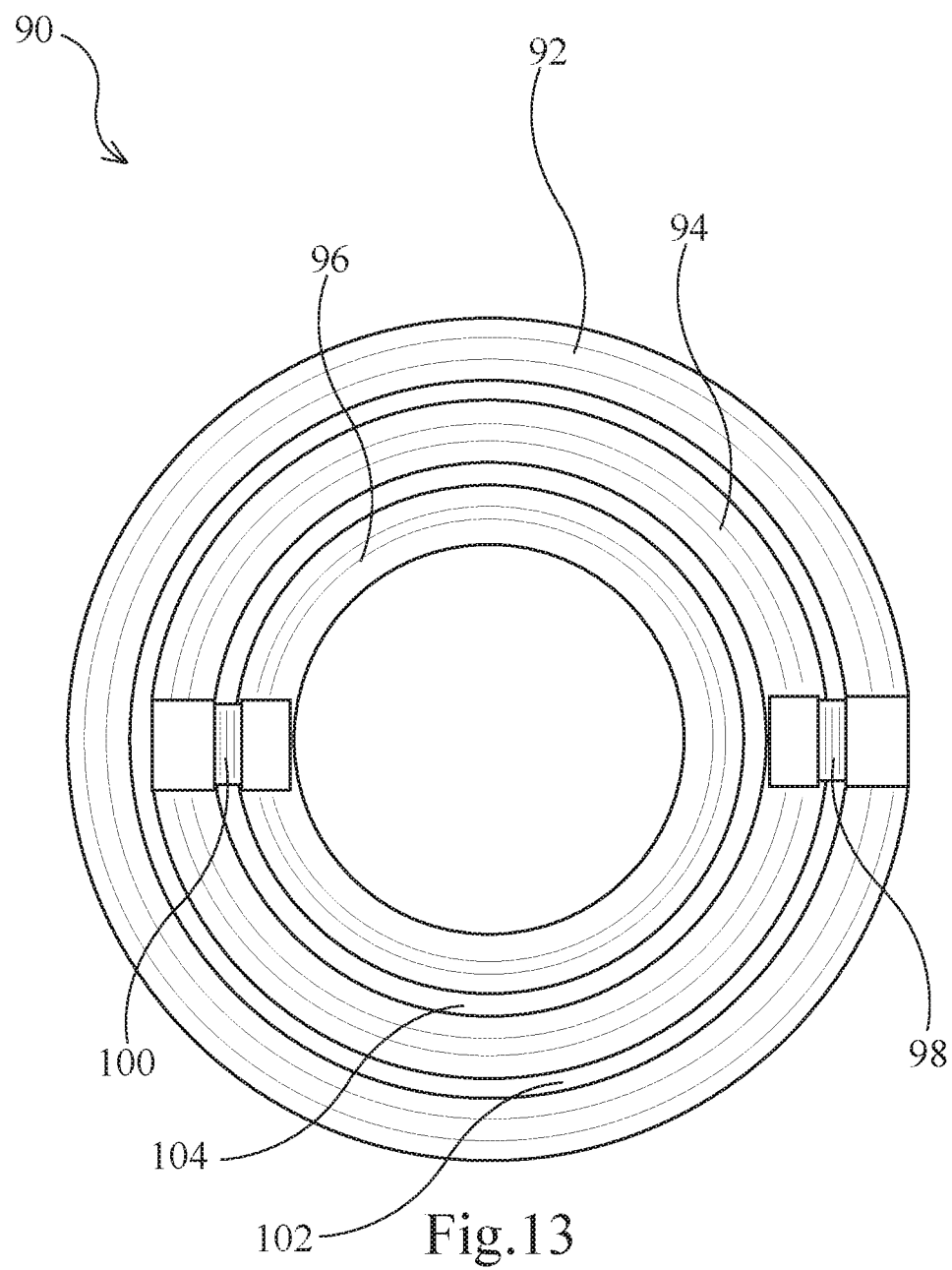
FIG. 13 is a top, plan view of a fourth embodiment of an improved trivet system in a nested configuration.
Figure 14:
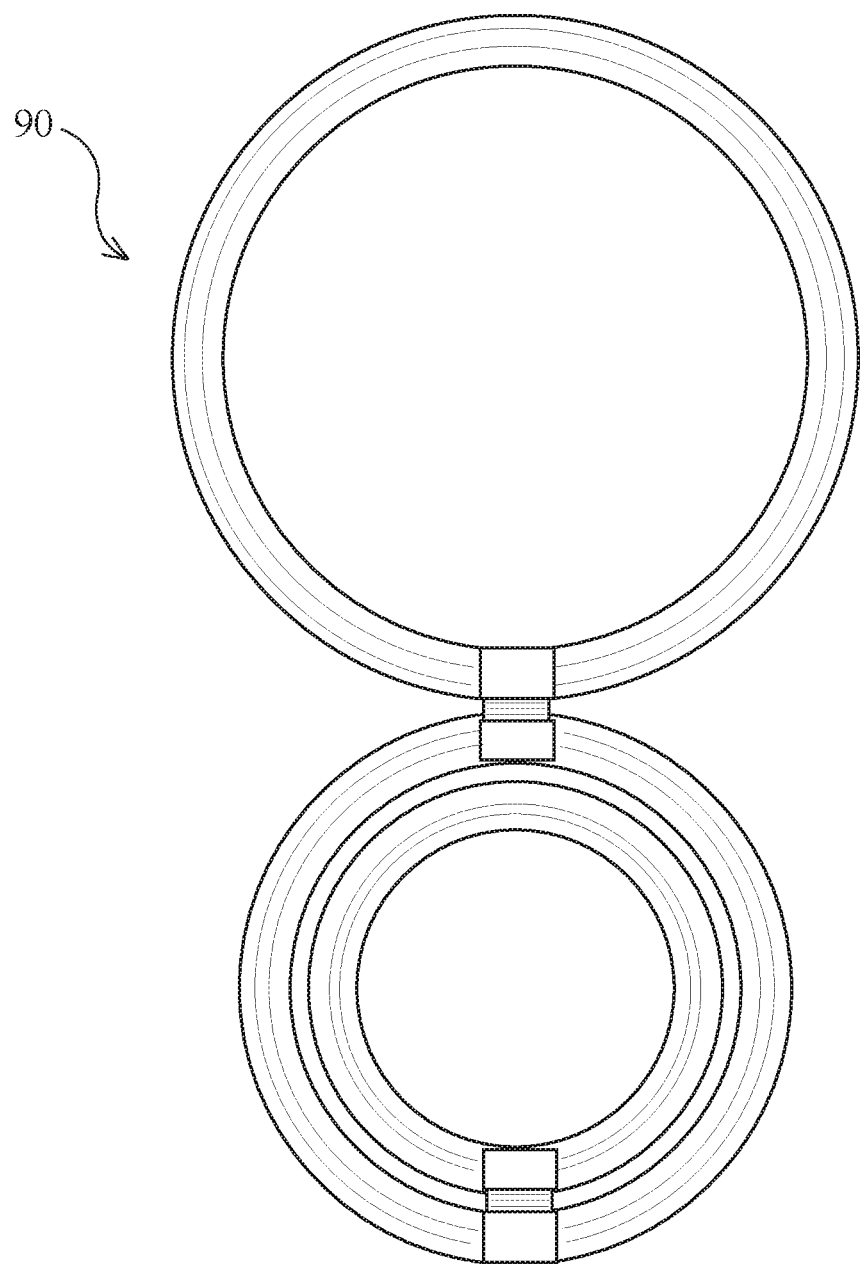
FIG. 14 is a top, plan view of the trivet system of FIG. 13 in a partially deployed configuration.
Figure 15:
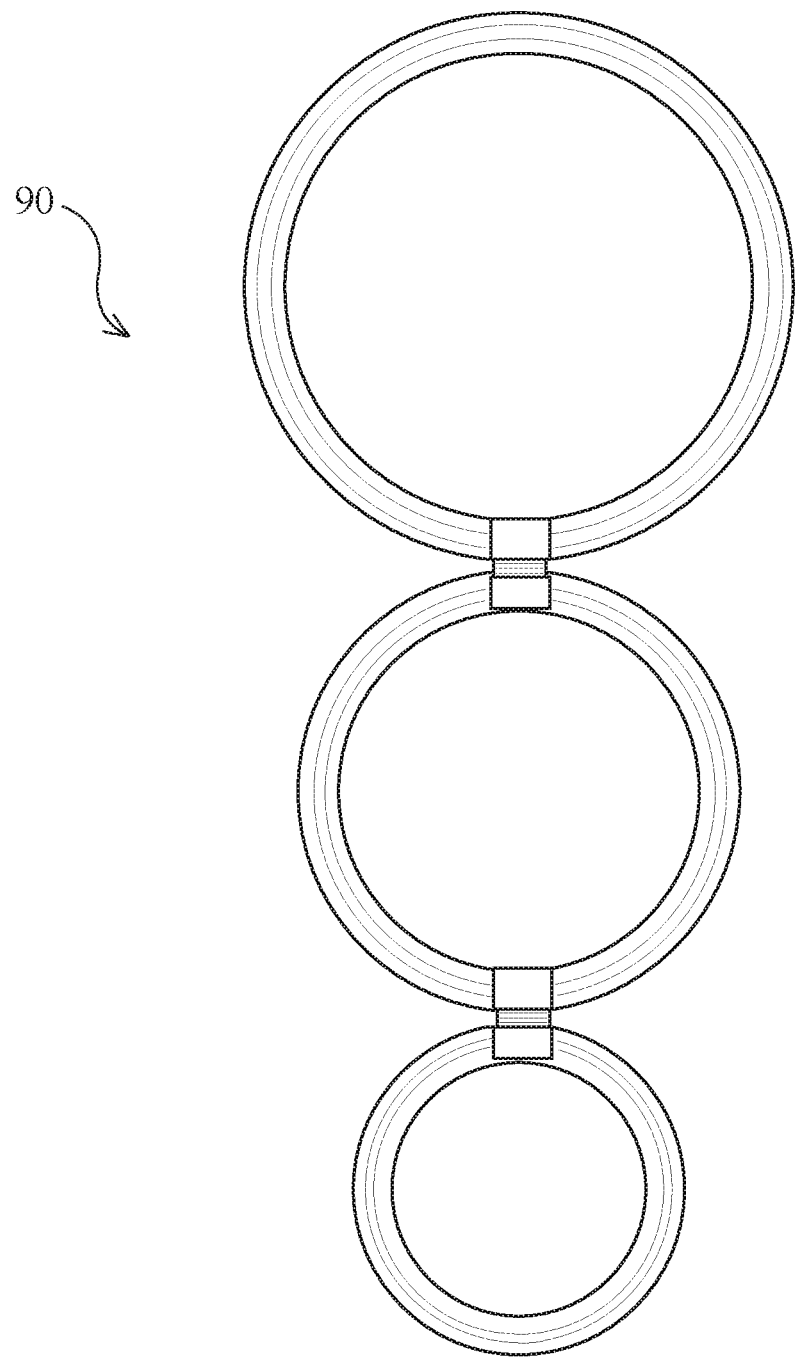
FIG. 15 is a top, plan view of the trivet system of FIG. 13 in a fully deployed configuration.

The embodiments of the trivet system shown in FIGS. 1 to 12 are formed of a natural material such as wood or stone which can withstand heat without transferring the heat to a surface upon which the trivet system is set. However, other embodiments of the trivet system may be formed from synthetic materials such as silicone which can also withstand heat without transferring the heat to a surface upon which the trivet system is set. A fifth embodiment of an improved trivet system 90 which is formed from a synthetic material is shown in FIGS. 13 to 15. The fifth embodiment of the trivet system 78 includes a first trivet 92, a second trivet 94, and a third trivet 96 which are substantially annular. A first hinge 98 pivotably couples the first trivet 92 to the second trivet 94 and a second hinge 100 pivotably couples the second trivet 94 to the third trivet 96. The hinges 98 and 100 maybe any suitable hinge and, in this embodiment, also function to provide respective spacing 102 and 104 between the trivets. Each spacing 102 and 104 may have a functional purpose.

Figure 16:
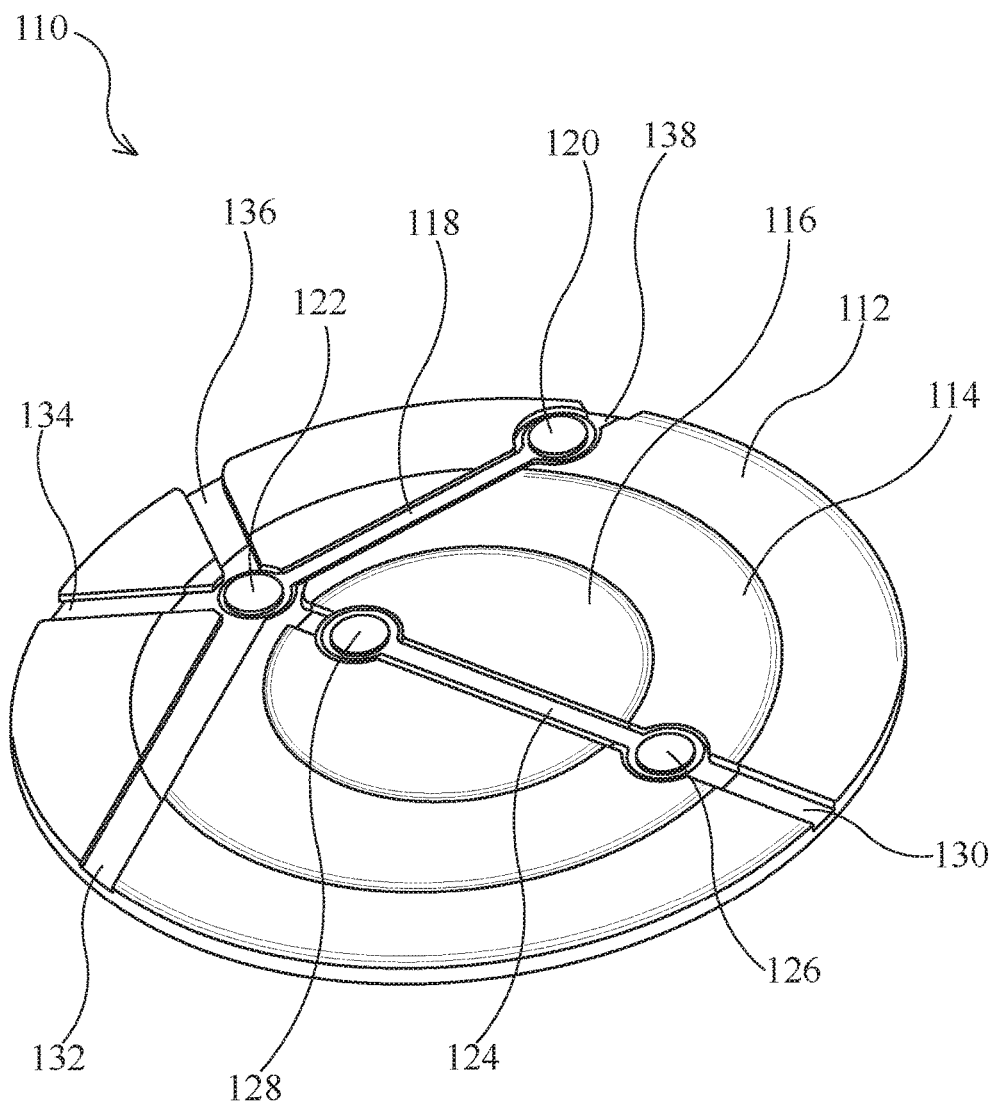
FIG. 16 is a top, side view of a sixth embodiment of an improved trivet system in a nested configuration.
Figure 17:
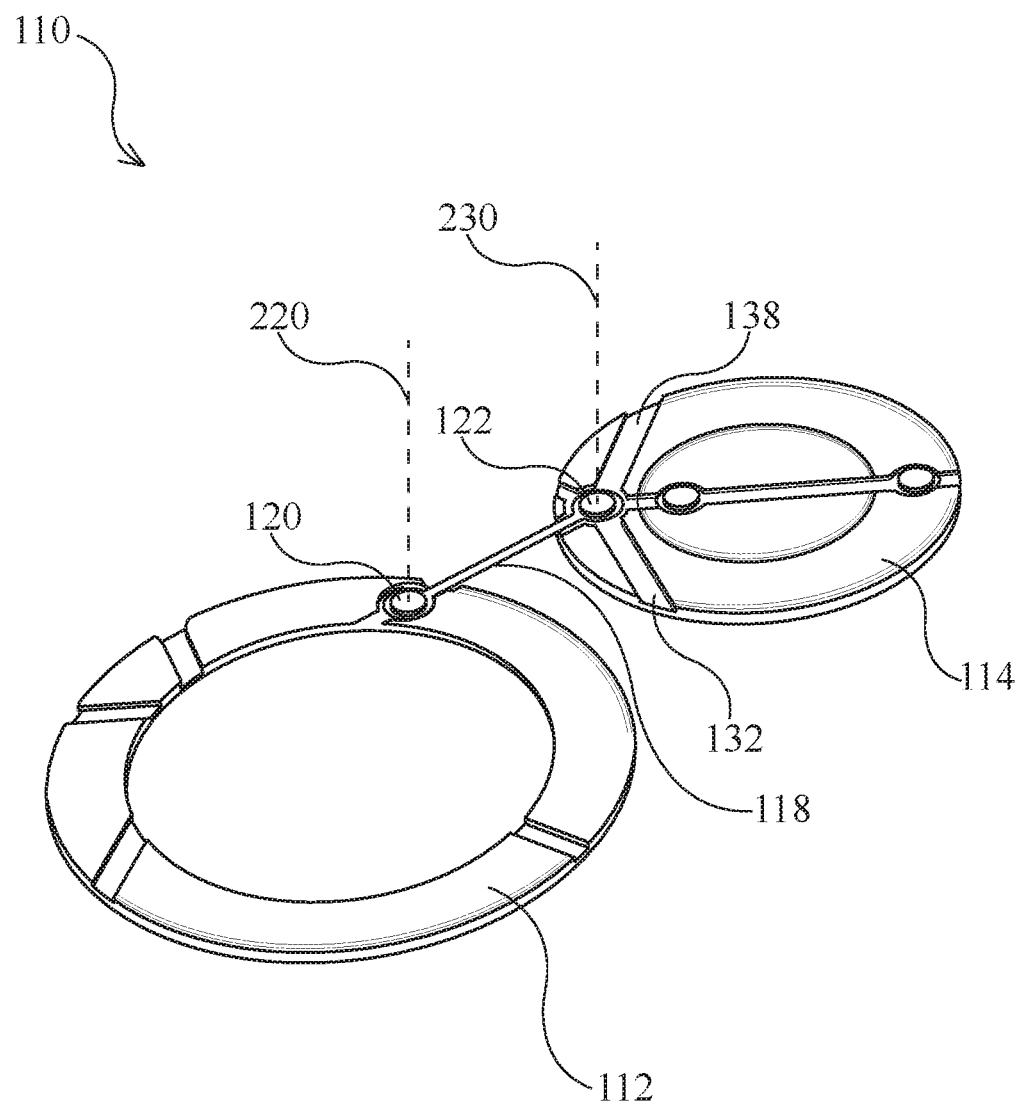
FIG. 17 is a top, side view of the trivet system of FIG. 16 in a partially deployed configuration.
Figure 18:
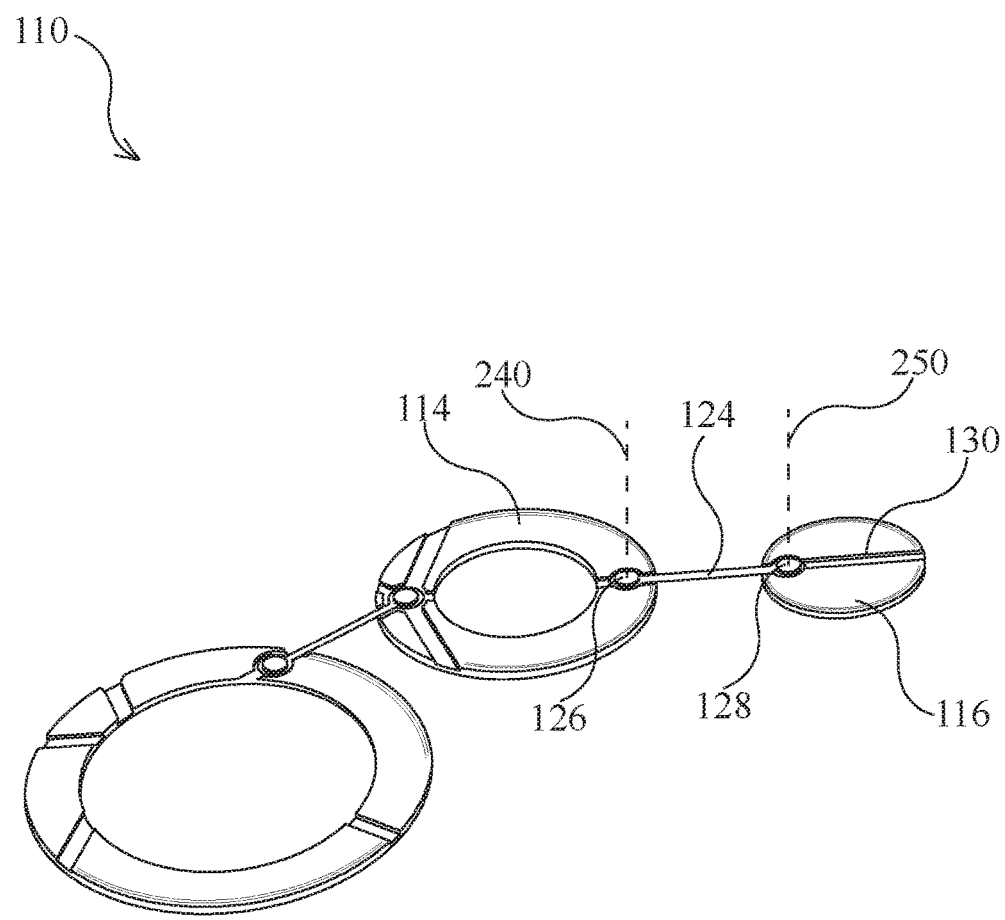
FIG. 18 is a top, side view of the trivet system of FIG. 16 in a fully deployed configuration.

Rather than being coupled by hinges other embodiments of the trivet system may be coupled by another suitable mechanical connector, for example, as shown in FIGS. 16 to 18 for a sixth embodiment of an improved trivet system 110. The sixth embodiment of the improved trivet system 110 includes a first trivet 112 and a second trivet 114 which are substantially annular as well as a third trivet 116 which is substantially circular.

A connector in the form of a first swing-connector 118 couples first trivet 112 and the second trivet 114. The first trivet 112 is rotatable at its point of connection 120 with the first swing-connector 118 about an axis 220 which is orthogonal to a plane containing the trivet system 110, and the second trivet 114 is pivotable about the axis 220. Likewise the second trivet 114 is rotatable at it is point of connection 122 with the first swing-connector about an axis 230 which is orthogonal to the plane containing the trivet system 110, and the second trivet 114 is pivotable about the axis 230.

A connector in the form of a second swing-connector 124 couples second trivet 114 and the third trivet 116. The second trivet 114 is rotatable at its point of connection 126 with the second swing-connector 126 about an axis 240 which is orthogonal to the plane containing the trivet system 110, and the third trivet 116 is pivotable about the axis 240. Likewise the third trivet 116 is rotatable at it is point of connection 128 with the second swing-connector about an axis 250 which is orthogonal to the plane containing the trivet system 110, and the second trivet 114 is pivotable about the axis 250.

The above described rotation and pivoting of the trivets 112, 114 and 116 allows the trivets to move relative to one another and the trivet system 110 to move between the nested configuration shown in FIG. 16 and the deployed configurations shown in FIGS. 17 and 18. The trivet system 110 is also provided with a plurality of channels 130, 132, 134, 136 and 138 which are best shown in FIG. 16 and releasably receive the swing-connectors 126 and 128. The channels determine the possible angular orientation of the trivets relative to one another as they restrict movement of the swing-connectors 126 and 128. The possible spatial orientation of the trivets in the deployed configuration may accordingly be predetermined and movement of the trivets restricted.

Figure 19:
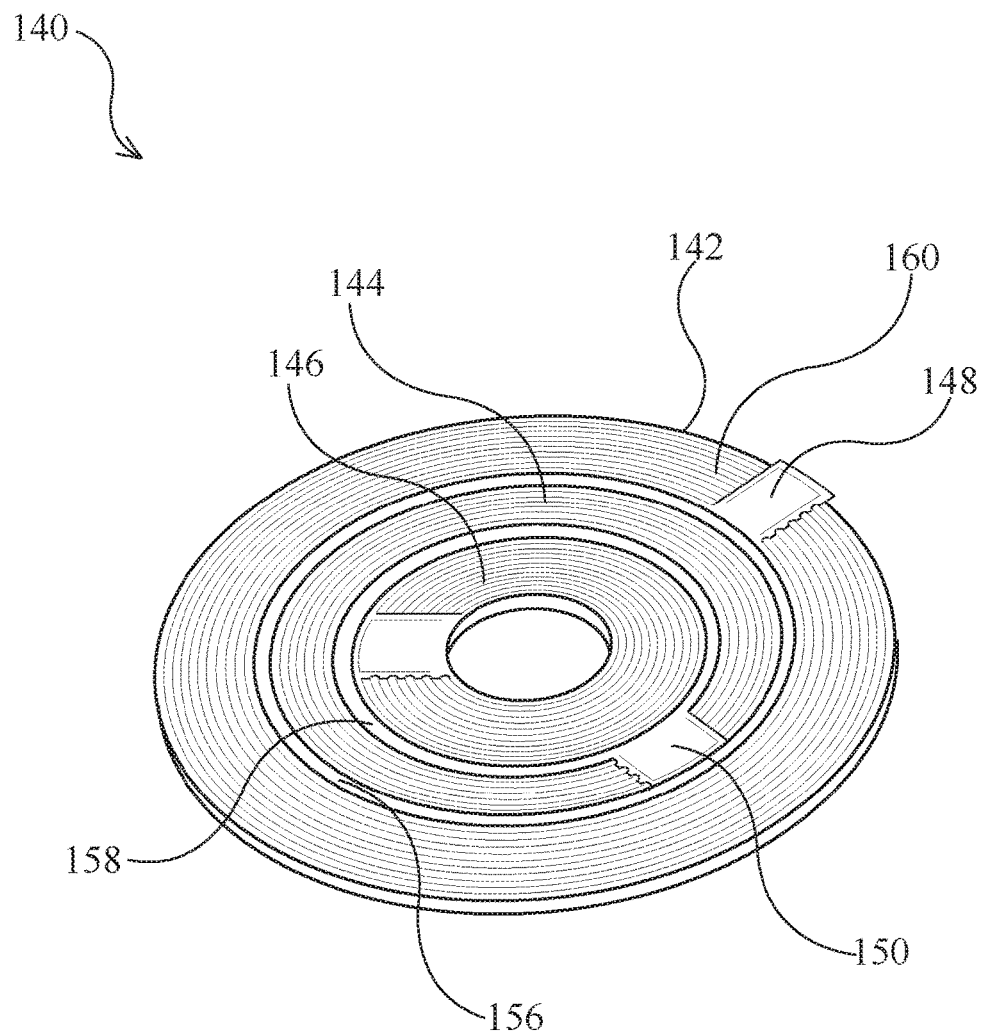
FIG. 19 is a top, side view of a seventh embodiment of an improved trivet system in a nested configuration.
Figure 20:
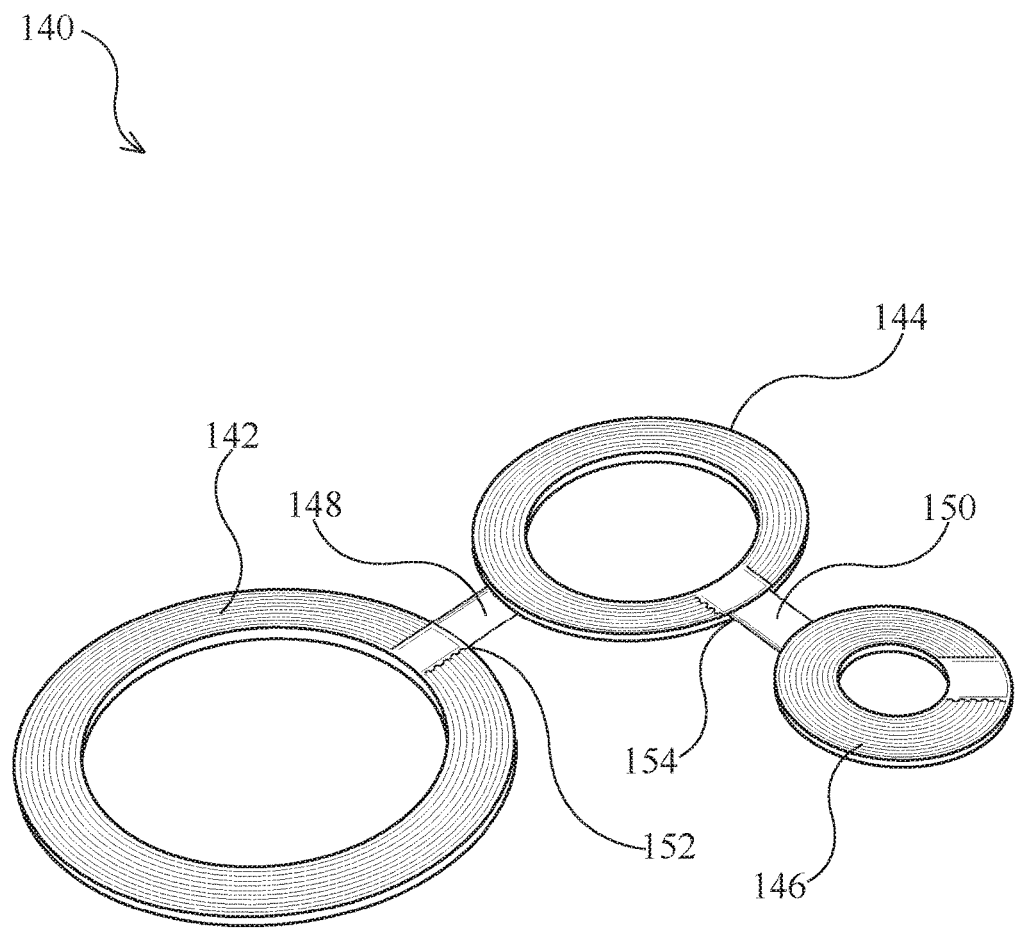
FIG. 20 is a top, side view of the trivet system of FIG. 19 in a fully deployed configuration.

Other embodiments of the improved trivet system the trivets may not be coupled a mechanical means such as a hinge or swing-connector but the trivets may instead be unitary and connected by living or folding hinges. It will be understood by those skilled in the art that the use of living or folding hinges is well suited for use when the trivet system is formed of a flexible material such as silicone or another polymeric material. A seventh embodiment of an improved trivet system 140 provided with living or folding hinges is shown in FIGS. 19 and 20. The trivet system 140 includes a first trivet 142, a second trivet 144, and a third trivet 146 which are substantially annular. A first folding hinge 148 pivotably couples the first trivet 142 to the second trivet 144 and a second folding hinge 150 pivotably couples the second trivet 144 to the third trivet 146.

The first folding hinge 148 is unitary with both the first trivet 142 and the second trivet 144. The first folding hinge 148 is provided with a line of weakness 149 about which the first trivet 142 and the second trivet 114 moveable relative to one another between the positions shown in FIGS. 19 and 20. The second folding hinge 150 is unitary with both the second trivet 144 and the third trivet 146. The first folding hinge 150 is provided with a line of weakness 151 about which the second trivet 144 and the third 146 are moveable relative to one another between positions shown in FIGS. 19 and 20.

The seventh embodiment of the trivet system 140 is also provided with a locking or retaining mechanism to releasable maintain the trivet system 140 in the nested configuration as shown in FIG. 19. The locking mechanism or retaining mechanism, in this embodiment, comprising magnets 152 and 154 which are disposed on edges of the trivets. However, other embodiments of the trivet system may be provided with mechanical locking or retaining mechanisms such a latch or inter-engaging male and female connectors. The trivets 142, 144 and 146 of the seventh embodiment of the trivet system 140 are also provided with ridges on sides thereof, for example, ridge 160 shown for the first trivet 142 in FIG. 19. The ridges are positioned such that, in the nested configuration, the outermost ridges of the third trivet 146 are engaged with the innermost ridges of the second trivet 144, and the outermost ridges of the second trivet 144 are engaged with the innermost ridges of the first trivet 142. The trivets are accordingly stacked in the nested configuration. The ridges may also function to dissipate heat.

It will be understood by a person skilled in the art that many of the details provided above are by way of example only, and are not intended to limit the scope of the invention which is to be determined with reference to the following claims.

What is claimed is:

1. A trivet system comprising:
   a first trivet;
   a second trivet coupled to the first trivet by a first elongate connector, the first trivet being rotatable at its point of connection with the first elongate connector about an axis which is orthogonal to a plane containing the first trivet and the second trivet being rotatable about its point of connection with the first elongate connector about an axis which is orthogonal to a plane containing the second trivet, and the first trivet and the second trivet being movable relative to one another between a position in which the second trivet is disposed within a perimeter of the first trivet and a position in which the second trivet it disposed outside the perimeter of the first trivet; and
   a third trivet coupled to the second trivet by a second elongate connector, the second trivet being rotatable about its point of connection with the second elongate connector about an axis which is orthogonal to the plane containing the second trivet and the third trivet is rotatable at is point of connection with the first elongate connector about an axis which is orthogonal to a plane containing the third trivet, and the second trivet and the third trivet being movable relative to one another between a position in which the third trivet is disposed within a perimeter of the second trivet and a position in which the third trivet is disposed outside the perimeter of the second trivet.

2. The trivet system as claimed in claim 1 wherein:
   the first trivet is pivotable relative to the second trivet;
   the second trivet is pivotable relative to the first trivet and the second trivet is pivotable relative to the third trivet; and
   the third trivet is pivotable relative to the second trivet.

3. The trivet system as claimed in claim 1 further including channels for receiving the first elongate connector and the second elongate connector.

* * * * *